Dec. 8, 1970  A. T. SHERBERT, JR  3,545,269
DISPLAY APPARATUS
Filed Oct. 14, 1968  4 Sheets-Sheet 3

INVENTOR:
ARCHIE T. SHERBERT, JR.
BY
ATTORNEY

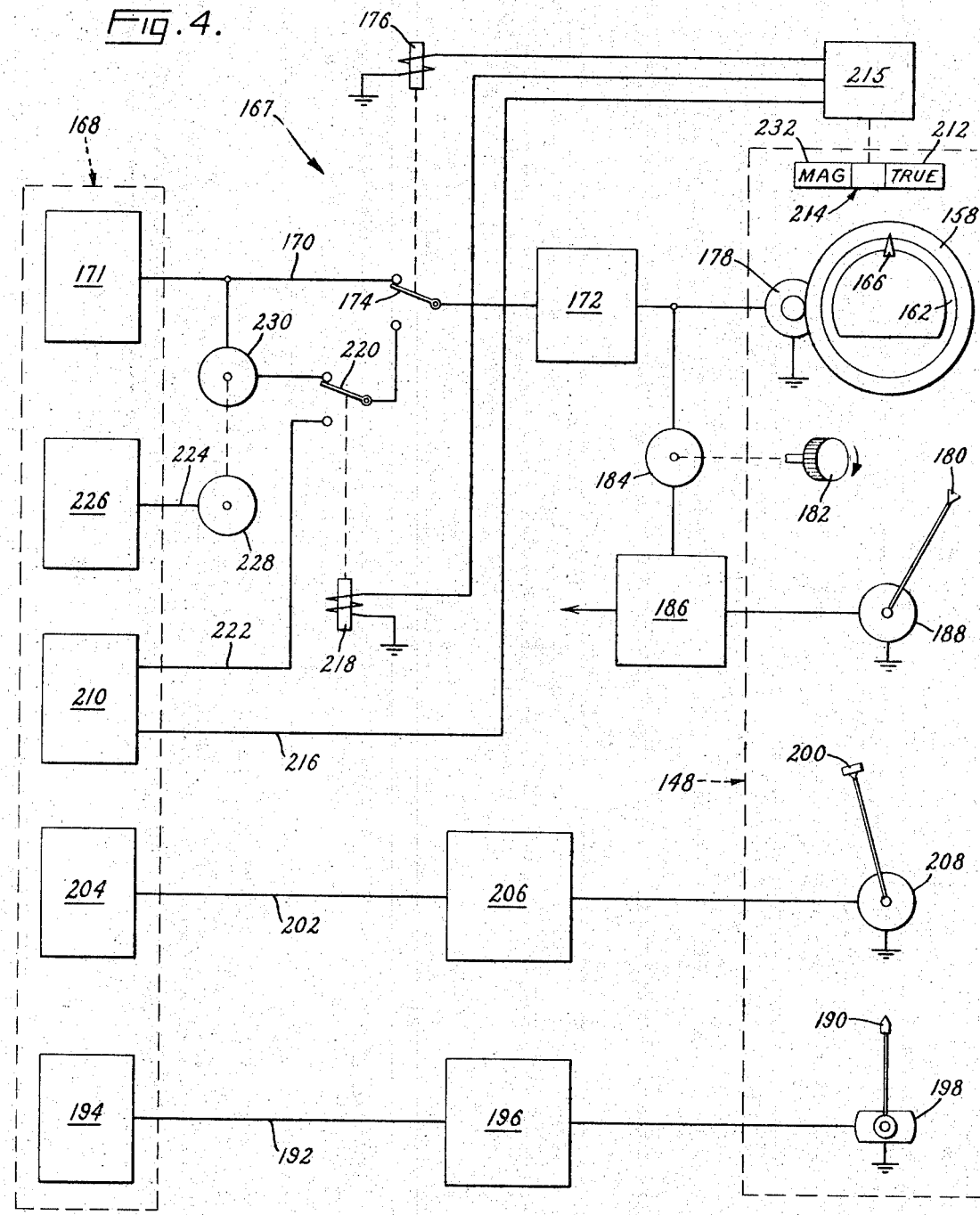

United States Patent Office 3,545,269
Patented Dec. 8, 1970

3,545,269
DISPLAY APPARATUS
Archie T. Sherbert, Jr., Media, Pa., assignor to The Boeing Company, Seattle, Wash., a corporation of Delaware
Filed Oct. 14, 1968, Ser. No. 767,169
Int. Cl. G01c 21/00
U.S. Cl. 73—178                     22 Claims

ABSTRACT OF THE DISCLOSURE

Apparatus for displaying information relating to the operation of a vehicle such as an aircraft. A first display provides information representing values of first operating conditions of the vehicle, a second display adjacent the first display provides information representing values of second operating conditions of the vehicle as time derivatives of the first operating conditions, and reference pointers simultaneously indicate specific values of the first and second operating conditions in an interrelated manner. In one embodiment, the displays are rectilinear scales in side-by-side relationship indicating altitude and vertical speed, respectively, and in another embodiment, the displays are concentric circular scales indicating heading and turn rate, respectively.

---

The invention relates generally to instruments for manned vehicles and specifically to such instruments which aid in the performance and simplify the operation of the vehicle.

Although the instruments herein disclosed are described with respect to their application to aircraft, it is to be understood that the invention is not to be so limited for the reason that the instruments are applicable to all vehicles which operate in a manner similar to an aircraft.

In the early days of manned flight, few instruments were required to provide information relating to various operating conditions of the aircraft. However, as aircraft speeds increased and the aircraft became more complex, it became necessary to increase the number of instruments in the aircraft so as to provide for the pilot a visual display of the primary conditions affecting the operation of the aircraft. Eventually, the number of instruments in the aircraft became so numerous that in some instances it was even necessary to add a special crew member such as a flight engineer to monitor many of these instruments. In some instances, interrelated information was provided on widely separated instruments such that a pilot who, for example, desired to know at a given instant both his altitude and his rate of climb, was forced to scan the instrument panel in order to correlate the information from these instruments. Such activity on the part of the pilot consumed valuable time during which he could be performing other necessary operations.

The present invention is the result of attempts to improve upon such conventional instrumentation, and to this end, provides an instrument capable of displaying all information relating to a single condition of the aircraft, enabling the pilot to ascertain the desired information at a single glance. To this end, the invention includes a first display which provides information representing the values of first operating conditions of the vehicle, a second display adjacent the first display to provide information representing the values of second operating conditions of the vehicle as mathematical derivatives of the first operating conditions, and reference pointers which simultaneously indicate specific values of the first and second operating conditions in an interrelated manner. In one embodiment, the displays are rectilinear scales in side-by-side relationship indicating altitude and vertical speed, respectively, and in another embodiment, the displays are concentric circular scales which indicate heading and turn rate, respectively. The unique displays provide the pilot of the vehicle with the opportunity of comparing rate information with quantity information; for example, comparing vertical velocity against altitude in such a manner as to improve the ability of a pilot to perform desired maneuvers. Another advantage of the invention resides in the capability of the instrument to automatically switch from one input source to another and to provide the pilot with the ability to selectively switch from one input source to another.

Accordingly, it is a primary object of the invention to provide a new and improved instrument for displaying information relating to the operation of a vehicle.

Another object of the invention is the provision of a new and improved aircraft instrument capable of simplifying the operation of a vehicle and improving the ability of a pilot to perform desired maneuvers.

A further object of the invention is the provision of a new and improved aircraft instrument which combines all of the information relating to a particular flight condition. A related object is the provision of such an instrument which combines all altitude information into a unified display. Still another related object of the invention is the provision of such an instrument which combines all heading information into a unified display.

Yet another object of the invention is the provision of a new and improved aircraft instrument which provides a display of a pair of operating conditions, one of the conditions being a mathematical derivative of the other such that the pilot can correlate the value of one condition against the value of the other, thereby achieving optimum performance of the aircraft. A related object is to provide such an instrument in which one of the operating conditions is altitude and the other of the operating conditions is vertical speed. Another related object is such an instrument in which one of the operating conditions is heading and the other of the operating conditions is turn rate.

Still a further object of the invention is the provision of a new and improved aircraft instrument which is responsive to either of a pair of input sources and which is operable to automatically switch from one source to the other in the event of a failure of the one source. A related object is the provision of such an instrument which permits the pilot of the aircraft to selectively switch from one input source to the other.

Other and further objects and advantages of the invention will be apparent or will be described in detail in the following specification taken together with the accompanying drawings.

In the drawings, in which like numerals refer to like parts throughout:

FIG. 4 is a schematic block diagram of another control system constructed in accordance with the invention and utilized to operate the instrument shown in FIG. 3.

Figure 1:
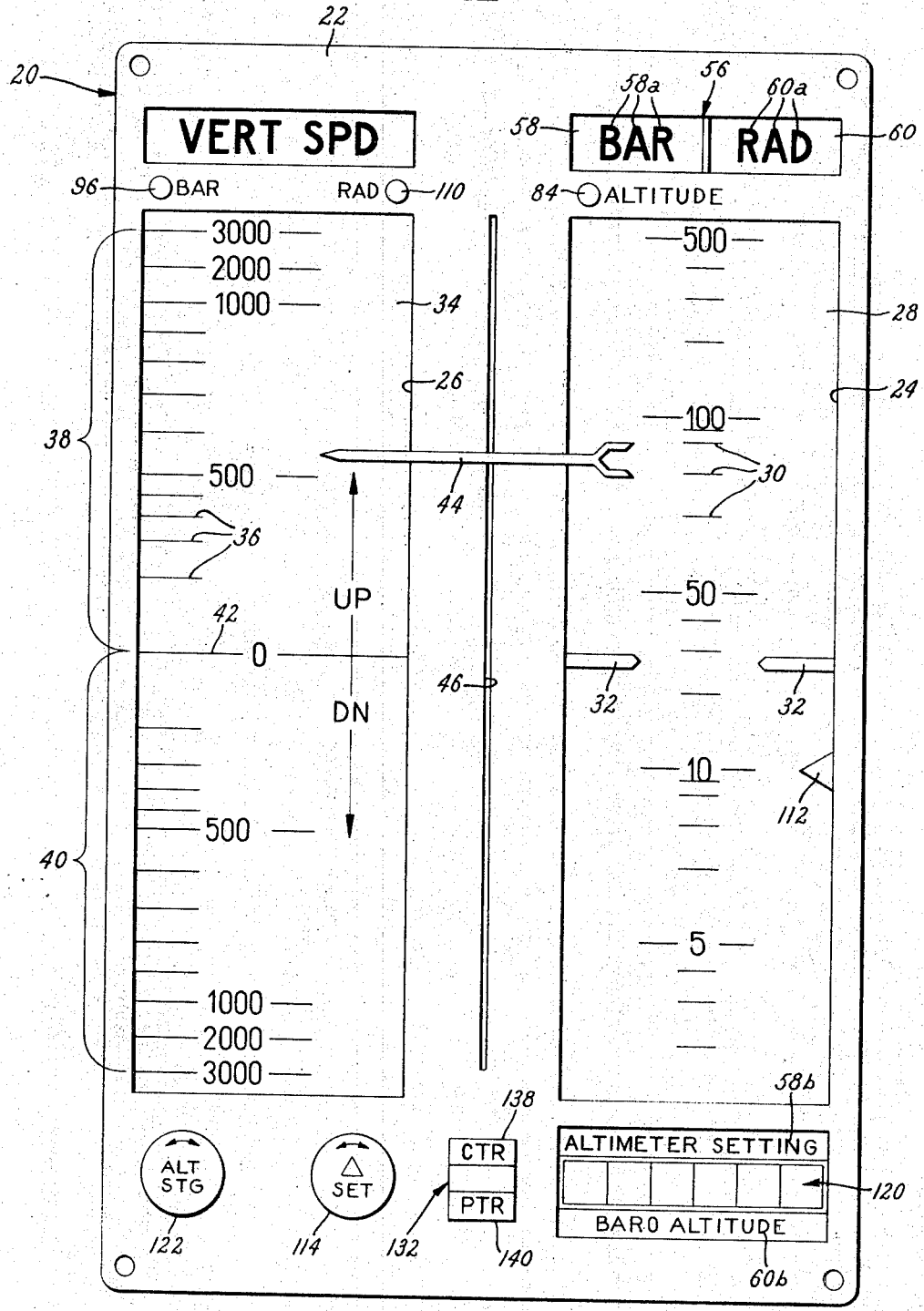
FIG. 1 is a front elevation view of an instrument embodying the invention.

Refer now to the drawings and initially to FIG. 1 which is illustrative of an instrument 20 which embodies the principles of the invention. The instrument 20 is preferably mounted in the cockpit of an aircraft (not shown) so as to face the pilot for his ready reference. In the embodiment shown in FIG. 1, the instrument 20 combines all applicable information relating to altitude and vertical speed, that is, change of altitude of the aircraft.

Specifically, the instrument 20 includes a panel or face 22 which is provided with a pair of rectangular windows 24 and 26 extending in a generally vertical direction and positioned in substantially side-by-side relationship. The window 24 provides an outline for a first display in the form of a movable scale 28 on which logarithmically spaced markings 30 are provided to indicate the altitude of the aircraft. A first indicia mechanism in the form of opposed pointers 32 normally indicates the altitude of the aircraft on the scale 28. Similarly, the window 26 provides an outline for a second display in the form of a stationary rectilinear scale 34 on which there are provided two sets of markings 36, preferably spaced logarithmically, representing vertical speed of the aircraft, namely, an upwards set 38 and a downwards set 40. Values of vertical speed in an upwards or ascending direction are indicated by the upwards set 38 of markings which are arranged in increasing value as the distance above an initial reference mark 42 increases, and, in a similar manner, values of vertical speed in a downwards or descending direction are indicated by the downwards set 40 of markings which are arranged in increasing value as the distance below the initial reference mark 42 increases. A second indicia mechanism in the form of a pointer 44 is movable relative to the scale 34 along a vertically extending slot 46 provided in the face 22 between the windows 24 and 26 and serves to indicate values of vertical speed on the scale 34.

Figure 2:
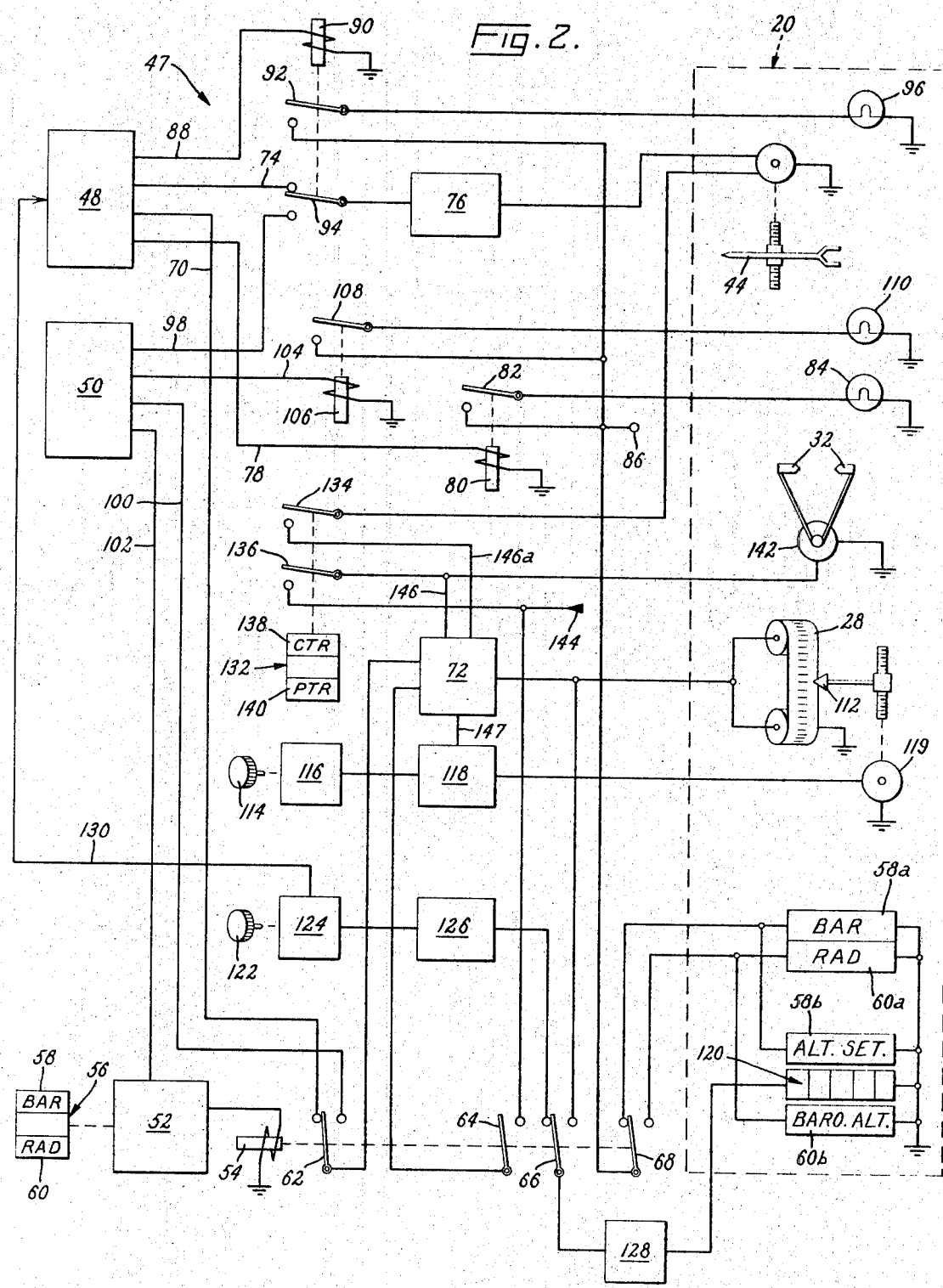
FIG. 2 is a schematic block diagram of a control system constructed in accordance with the invention and utilized to operate the instrument shown in FIG. 1.

Refer now to FIG. 2 which schematically depicts a system 47 adapted to provide altitude and vertical speed information for display by the instrument 20. A pair of continuously operating sources of input information for the instrument 20 are represented by a barometric altitude source 48 and a radar altitude source 50. The barometric altitude source 48 may be any one of a number of commercially available Central Air Data Computers designated by the acronym CADC. One example of a commercially available radar altitude source 50 is the Honeywell HG–9000 radar altimeter. Both sources 48 and 50 are in continuous operation throughout operation of the aircraft.

It is to be understood that all relays indicated in FIG. 2 are shown in positions assumed when the system 47 is in the inoperative or de-energized condition. The system is suitably activated or energized when the aircraft power system is initiated and when this occurs, all of the relays shown retain the positions previously assumed. Thus, at the outset of operation, the source 48 provides all input information for the instrument 20. At the option of the pilot, a mode selector unit 52 serves to actuate a relay 54 for selectively connecting the source 48 or the source 50 into the appropriate portions of the system 47. The pilot can perform this operation by pressing the appropriate button on an integrally lighted mode selector switch 56. One button 58, for example, may be marked "BAR" to indicate the barometric altitude source 48 and the other button 60 may be marked "RAD" to indicate the radar altitude source 50. Upon actuation of the button 58, an appropriately marked lamp 58a integral to the button 58 and another appropriately marked lamp 58b on the face 22 of the instrument 20 are lighted by the EMF source 86 via a contact 68 of the relay 54. Upon actuation of the button 60, an appropriately marked lamp 60a integral to the button 60 and another appropriately marked lamp 60b on the face 22 of the instrument 20 are similarly lighted. Henceforth in this description, when the button 58 has been pressed, the system 47 shall be said to be in the "BAR" mode; and when the button 60 has been pressed, the system shall be said to be in the "RAD" mode.

Assuming all contacts, namely, 62, 64, 66, and 68 of the relay 54 are in the positions shown in FIG. 2, an altitude signal output represented by a conductor 70 from the source 48 excites, via contact 62, a suitable first scaling and drive mechanism 72 which, in turn, drives the altitude scale 28 relative to the pointers 32 (FIG. 1). At the same time, a vertical speed output, as represented by a conductor 74 from the source 48, serves to excite, via control 94 of relay 90, a second suitable scaling and drive mechanism 76 which, in turn, causes movement of the pointer 44 along the slot 46. Thus, at any instant, the pointers 32 indicate altitude of the aircraft and the pointer 44 indicates the vertical speed of the aircraft and whether the vertical speed is upwards or downwards. In the event of a failure of the source 48 such that it is unable to generate an altitude signal, an altitude failure signal, as represented by a conductor 78, actuates a relay 80 to move its contact 82 from the position shown to a position connecting a warning lamp 84 on the face 22 of the instrument 20 to a suitable source of EMF 86. In this event, the scaling and drive mechanism 72 is preferably operable to position the altitude scale 28 such that no altitude markings 30 appear in the window.

Should the source 48 fail to generate a vertical speed signal, a vertical speed failure signal, as represented by a conductor 88, serves to operate a relay 90 to move its contacts 92 and 94 from the positions shown in FIG. 2 to their adjacent positions. Thus, upon failure of the vertical speed signal from the source 48, a warning lamp 96 on the face 22 of the instrument 20 is lighted via the contact 92 by the source of EMF 86. Also, a vertical speed signal from the radar altitude source 50, as represented by a conductor 98, is admitted to the system 47 via the contact 94 of relay 90 and signals the scaling and drive mechanism 76, thereby assuring continued operation of the pointer 44 even in the absence of a vertical speed signal from the source 48.

Should the pilot desire to change the source of input altitude information into the system 47 from the barometric altitude source 48 to the radar altitude source 50, he presses the button 60 of the mode selector switch 56, thereby adjusting a setting within the mode selector unit 52 and operating the relay 54 to move each of its contacts from the positions indicated in FIG. 2 to their adjacent positions. When this has been accomplished, an altitude signal, as represented by a conductor 100 from the source 50, energizes the scaling and drive mechanism 72 via the contact 62 of relay 54, causing the scale 28 to move accordingly and register radar altitude between the pointers 32. However, it should be noted that, except for the failure of the barometric vertical speed signal from the source 48, the radar vertical speed signal from the source 50 is ineffective to energize the scaling and drive mechanism 76. That is, due to the increased accuracy of vertical speed information obtainable from the source 48 as compared with that obtainable from the source 50, the vertical speed signal from the source 50 is not used even during radar mode operation except in the instance that the vertical speed signal from the source 48 has failed.

In the event of a failure of the altitude signal from the source 50, an altitude failure signal, as represented by a conductor 102, causes the mode selector unit 52 to operate the relay 54 to return all of its contacts to the positions indicated in FIG. 2. Thus, failure of the altitude signal from the source 50 results in the transfer of input altitude information provided to the instrument 20 from the source 50 to the source 48. Should there be a failure of the vertical speed signal from the source 50, a vertical speed failure signal, as represented by the conductor 104, is effective to operate a relay 106 to move its contact 108 from the position shown in FIG. 2 to its adjacent position, thereby connecting a warning lamp 110 on the front panel 22 of the instrument 20 to the source of EMF 86.

It may be desirable for the pilot at the outset of a flight to manually adjust a movable index mark 112 to a desired position adjacent a particular one of the linear markings 30 on the movable scale 28. The mark 112

(FIG. 1) is suitably mounted adjacent the scale 28 at one edge of the window 24 and is movable relative to the scale 28 by means of a setting knob 114 mounted on the face 22 of the instrument 20. Operation of the setting knob 114 positions a transducer 116 which, in turn, signals an index scaling and drive mechanism 118 for driving a suitable motor 119. Although the index mark 112 is manually movable along the scale 28 by means of the knob 114, once the mark is placed in a selected position, it remains stationary in relation to the scale 28 and moves in unison with the scale. As shown in FIG. 1, the mark 112 is positioned adjacent a marking 30 which indicates ten feet of altitude. As the altitude of the aircraft approaches ten feet, the mark 112 moves with the scale 28 toward the pointer 32 and when it moves beneath its associated pointer 32, the pilot is thereby put on notice that the aircraft has reached the ten foot altitude referenced by the mark 112.

At the option of the pilot, another manual adjustment can be performed when the system 47 is in the "BAR" mode. This adjustment regulates a display 120 in the form of a mechanical digital counter to provide a visual indication of local barometric pressure (altimeter setting) as indicated by the lamp 58b. By a knob 122 suitably mounted on the face 22 of the instrument 20, an altimeter setting transducer 124 provides a signal to an altimeter setting scaling and drive mechanism 126 which, in turn, via contact 66 of relay 52, energizes a counter driver 128. A correction signal as represented by a conductor 130 and corresponding to the value presented on the display 120 is preferably provided to the source 48 from the altimeter setting transducer 124. In the event the system 47 is operative in the "RAD" mode, movement of the knob 122 is ineffective to alter the setting of the display 120, but the display instead provides a digital indication of barometric altitude as indicated by the lamb 60b. Specifically, in this instance, the counter driver 128 is activated by the scaling and drive mechanism 72 via contact 66 of the relay 54.

When viewing FIG. 1, it is apparent that the pointers 32 are substantially co-linear with the initial reference mark 42 on the stationary scale 34. It follows, therefore, that there is a physical displacement between a line coextensive with the pointers 32 and a line coextensive with the pointer 44, except when the pointer 44 indicates a zero vertical speed. Since it may be advantageous to have the pointer 44 simultaneously indicate vertical speed and altitude of the aircraft, the invention provides, at the option of the pilot, for removal of the pointers 32 to hidden positions behind the face 22 and for advancement of the scale 28 such that a correct value of altitude is indicated by a bifurcated righthand end of the pointer 44. A control device in the form of a switch 132 includes a pair of contacts 134 and 136, the selective operation of which determines whether the pointers 32 or the pointer 44 indicate aircraft altitude. For ordinary operation during which the pointers 32 indicate aircraft altitude, hereinafter referred to as "CTR" mode, the pilot presses a first button 138 of the switch 132 with the result that the contacts 134 and 136 remain in the positions shown in FIG. 2. However, when it is desired to have the pointer 44 indicate a value of vertical speed on the scale 34, hereinafter referred to as "PTR" mode, and simultaneously indicate a value of altitude on the scale 28, another button 140 of the switch 132 is pressed. In this instance, a solenoid 142 is operable, upon being energized, to withdraw the pointers 32 to locations behind the face 22 and is so energized by a second source of EMF 144 via contact 136. A signal represented by a conductor 146, via contact 136, informs the scaling and drive mechanism 72 that the "PTR" mode of altitude indexing has been selected so that the scale 28 may be advanced by the amount required to bring the altitude displayed on scale 28 substantially into coincidence with the bifurcated end of the pointer 44. Additionally, a feedback signal from pointer 44 and represented by a conductor 146a, via contact 134, informs the mechanism 72 of the magnitude of the displacement existing between a line coextensive with the pointer 44 and a line coextensive with the pointers 32 in their active positions.

An additional feedback signal represented by a conductor 147 informs the index scaling and drive mechanism 118 of the magnitude of advancement of the scale 28. In this manner, the mechanism 118 is directed to move the index mark 112 so as to maintain its relative position on the scale 28. As a clear indication to the pilot of the operation just described, it would be preferable to mark the buttons 138 and 140 of switch 132 in a descriptive manner. For example, as illustrated, the word "CTR" is marked on the button 138 to represent that the value of the altitude is to be read at the center, or midway of the length of the window 24 and is indicated by the pointers 32. Similarly, as illustrated, the word "PTR" is marked on the button 140 to represent that the value of altitude is to be read adjacent the bifurcated end of the pointer 44. Although not shown herein, the word "CTR" or "PTR" could be lighted within the switch 132 to indicate the selected position.

In summary, therefore, either source 48 or source 50 is available to provide altitude and vertical speed information to the system 47, the particular choice being determined by which button of switch 56 is pressed. In the event the barometric mode button 58 is pressed, the scale 28 and the pointer 44 are driven in response to the signals 70 and 74, respectively, from the source 48. Upon failure of the source 48 to provide an altitude signal, the warning lamp 84 is lighted, and upon failure of the vertical velocity signal from the source 48, the vertical velocity signal from the source 50 automatically provides the necessary information for driving the pointer 44.

When the radar mode button 60 is pressed, the source 50 provides altitude information for the system 47 although vertical speed and barometric altitude information continues to be provided by the source 48. That is, the scale 28 is responsive to the altitude signal from the source 50 but the pointer 44 is movable in response to the vertical speed signal from the source 48 and the digital counter 120 is responsive to the altitude signal from source 48. Only in the event of failure of the vertical speed signal from the source 47 is the vertical speed signal from the source 50 employed to operate the mechanism 76. In the event the source 50 fails to operate an altitude signal, a resulting failure signal is effective to automatically operate the mode selector unit 52 such that altitude and vertical velocity information is subsequently provided to the system 47 by the source 48. In the event the source 50 fails to operate a vertical velocity signal, the lamp 110 is lighted as warning to the pilot. The knob 114 provides the pilot with the opportunity to set the movable index mark 112 to advise him of a reference altitude condition while another knob 122 is at the pilot's disposal for the manual setting of the barometric pressure corresponding, for example, to the pressure at his take-off location, and adapted to provide such information as a correction factor to the source 48. As desired, by pressing the button 140, the pointers 32 are withdrawn from the scale 28 and, thereupon, the scale is suitably advanced such that the bifurcated end of the pointer 44 indicates the correct altitude while at the same time the opposite end of the pointer 44 indicates the vertical speed.

By reason of the arrangement of the instrument 20, the pilot can readily and simultaneously compare his altitude with his vertical speed. In addition to all of the features already discussed, the instrument 20 is of further advantage to the pilot to the end of executing maneuvers rapidly and smoothly. Assume for purposes of explanation that the aircraft is in a climb condition and that the pointers 32 and 44 at a given instant indicate the values shown in FIG. 2, namely, an altitude of thirty feet and a rate of climb of 550 feet per minute. Further, assume that the pilot desires to level off at an altitude of 500 feet. In this instance, the scale 28 moves downwardly relative to the pointers 32 such that the pointers 32 indicate an ever-increasing value of altitude. At such time that the marking 30 reading the value of "500" moves to a position adjacent or in line with the bifurcated end of the pointer 44, the pilot should thereby be put on notice that it is proper for him to operate his controls to begin a levelling-off maneuver. A smooth maneuver can be achieved if he so operates his controls that the bifurcated end of the pointer 44 remains adjacent the "500" value as the scale 28 moves downwardly toward the pointers 32. If this relationship is maintained, the desired altitude, 500 feet in this instance, will be achieved at precisely that moment that the pointer 44 indicates "0" on the scale 34. Thus, the described maneuver has been accomplished smoothly and in a minimum length of time and without overtravel or undertravel which often occurs because of misjudgment on the part of the pilot and which requires a further corrective maneuver. Thus, the instrument 20 provides the pilot not only with altitude and rate of climb or rate of descent information, but also enables him to execute smooth maneuvers or maintain constant altitudes in a manner which would otherwise be difficult to achieve. The preceding maneuver would be performed in substantially the manner described if the button 140 had previously been pressed. However, instead of positioning the "500" marking adjacent the bifurcated end of the pointer 44 and maintaining that relationship until the pointer 44 is co-linear with the "0" marking or the scale 34, the pilot would control the aircraft in such a manner as to commence the downward movement of the pointer 44 at such time that the linear distance between the "500" marking on the scale 28 and the pointer 44 is approximately equal to the linear distance between the pointer and the "0" marking on the scale 34. Thereupon, he would continue to maneuver the aircraft such that the "500" marking on the scale 28 "chases" the bifurcated end of the pointer 44 such that the pointer 44 and the "500" marking on the scale 28 simultaneously achieve a co-linear relationship with the "0" marking on the scale 34.

Figure 3:
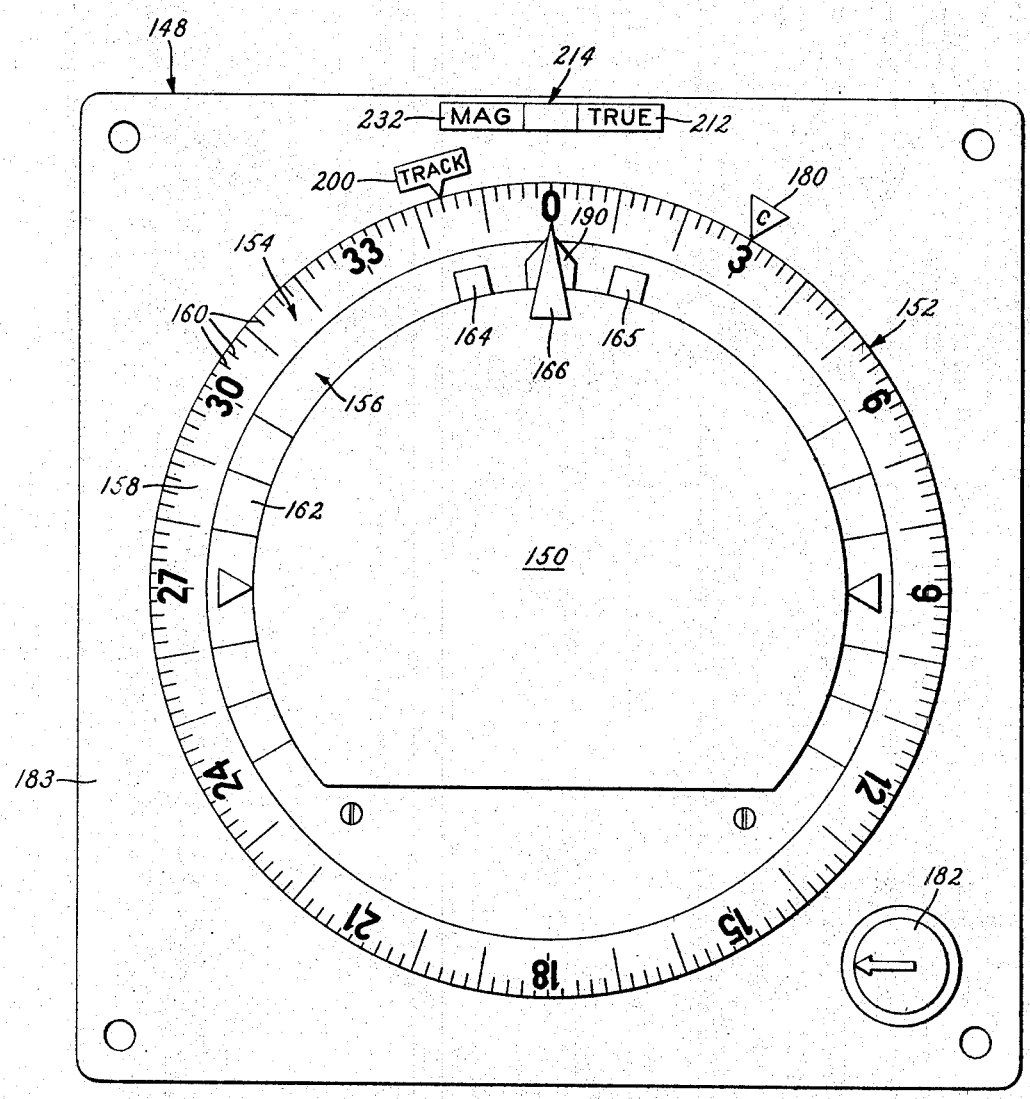
FIG. 3 is a front elevation view of an instrument which constitutes another embodiment of the invention.

Another embodiment of the invention as illustrated in FIG. 3 is an integrated flight director attitude heading indicator 148. The indicator 148 is composed of a flight director attitude indicator portion 150 of conventional design, such as the Collins FD–108 and a heading indicator 152 which includes a first display 154 and a second display 156. The first display 154 includes a movable scale 158 having compass markings 160 graduated about a full 360° arc to represent heading or actual direction of the aircraft. The second display 156 includes a stationary scale 162 having a pair of turn rate markings 164 and 165 one on either side of a first indicia mechanism or stationary pointer 166 which serves to indicate the direction in which the aircraft is heading.

Turn now to FIG. 4 which schematically depicts a system 167 adapted to provide heading and turn rate information for display by the instrument 148. All contracts in FIG. 4 are shown in positions which they assume when the system 167 is de-energized. Inputs of the instrument 148 of a variety of kinds of information are obtained from a suitable device 168 such as the Carousel IV Inertial Navigation System manufactured by AC Electronics Division of General Motors Corporation. Assuming the system 167 is initially energized upon initiating operation of the aircraft, an output signal represented by a conductor 170 and generated by a magnetic heading source 171 within the input device 168 actuates a heading scaling and drive mechanism 172 via a contact 174 of a relay 176. The mechanism 172 in turn operates a synchro motor 178 to rotate the movable scale 158. As the movable scale 158 is rotated, the pointer 166 refers to compass markings 160 so as to indicate the magnetic heading of the aircraft at any given moment.

At such time that the pilot desires to turn the aircraft toward a particular direction, he may enter the desired heading into the instrument 148 with the aid of a command course index marker 180. Specifically, by turning a knob 182 on a front panel 183 of the instrument 148, the pilot operates a control differential transformer 184 which in turn actuates a command course scaling and drive mechanism 186 to operate a motor 188 which suitably moves the index marker 180 along an outer peripheral edge of the movable scale 158. However, once the index marker 180 has been moved to a desired position on the movable scale by means of the set knob 182, it remains stationary relative to the movable scale 158.

With the index marker 180 indicating the new desired direction, the pilot can operate the necessary aircraft controls, for example, to maneuver the aircraft into a controlled rate turn such that a second indicia mechanism or pentagonal pointer 190 moves relative to the stationary scale 162 so as to indicate the aircraft's turn rate in terms of the turn rate markings 164 and 165. In this manner, the aircraft can be made to achieve any desired turn rate, for example, six degrees per second if the pentagonal pointer 180 overlaps either marking 164 or 165. Movement of the pentagonal pointer 190 relative to the stationary scale 162 is achieved when an output signal represented by a conductor 192 from a heading rate source 194 within the input instrument 168 actuates a heading rate scaling and drive mechanism 196 which in turn drives a suitable movement 198.

An indication of the track of the aircraft or the direction of its path with reference to the earth's surface is provided by a track index marker 200. Specifically, an output signal of aircraft drift angle which is equal to track angle minus heading is represented by a conductor 202 from a drift angle source 204 within the input instrument 168. The drift angle signal actuates a drift angle scaling and drive mechanism 206 which in turn energizes a motor 208 to suitably move the track index marker 200 along an outer peripheral edge of the movable scale 158.

All previous discussion relating to the indicator 148 has been with the assumption that the magnetic heading source has provided the signal for moving the movable scale 158. However, should the pilot desire to employ a true heading source 210 within the input device 168, he presses a button 212 on a heading selector switch 214 which actuates a mode selector unit 215 and thereby operates the relay 176 to move its contact 174 from the position shown in FIG. 4 to its adjacent position. The button 212 may be marked "TRUE" to indicate that the system 167 is currently in the true heading mode and that it is receiving heading information from the true heading source 210. Simultaneously, an output signal represented by a conductor 216 from the true heading source 210 operates, via the mode selector unit 215, a relay 218 to move its contact 220 from the position indicated in FIG. 4 to an adjacent position. When this occurs, a true heading output signal represented by a conductor 222 from the true heading source 210 actuates the heading scaling and drive mechanism 172 via the contacts 220 and 174 to energize the motor 178 and move the movable scale 158 accordingly. In the event of a failure within the true heading source 210, the signal 216 is interrupted causing the relay 218 to be de-energized and to return the contact 220 to the position indicated in FIG. 4. When this occurs, a magnetic variation signal represented by a conductor 224 from a magnetic variation source 226 within the input device 168 energizes a synchro motor 228 to drive a control differential transformer 230. The signal from the magnetic heading source, thus modified, actuates the heading scaling and driving mechanism 72 via the contacts 220 and 174 to energize the motor 178 and in turn drive the movable scale 158.

When it is again desirable for the system 167 to receive an input from the magnetic heading source, the pilot presses a button 232 marked "MAG" of the heading selector switch 214 thereby actuating the mode selector unit 215 to operate the relay 176 to return its contact 174 to the position shown in FIG. 4. The button 232 may be marked "MAG" to indicate that the system 167 is currently in the magnetic heading mode, that is, receiving heading information from the magnetic heading source 171. The operation of the command course index marker 180, the turn rate index marker 190, and the track index marker 200 remains substantially unchanged whether the button 212 or the button 232 of the heading selector switch 214 has been pressed.

Although such devices as warning lamps have not been described with respect to the embodiment of FIGS. 3 and 4, it is understood to be within the scope of the invention to provide such devices in a manner similar to that disclosed with respect to the embodiment of FIGS. 1 and 2.

In summary, therefore, to drive the movable scale 158, the pilot of the aircraft has the option of utilizing the output signal from either the magnetic heading source 171 or from the true heading source 210. In the event of failure of the output signal from the true heading source 210, the output signal from the magnetic heading source 171 is modified by the output signal from the magnetic variations source 226 and this combined signal energizes the heading scaling and drive mechanism 172 and results in movement of the movable scale 158.

By reason of the arrangement of the indicator 148, the pilot can readily and simultaneously compare his heading with his turn rate, and is further aided in his ability to execute maneuvers rapidly and smoothly. Assume, for purposes of explanation, that it is desired to turn the aircraft thirty degrees to the right. Before proceeding, the pilot turns the knob 182 until the command course index 180 is positioned adjacent the marking "3" on the scale 158. He thereupon maneuvers the aircraft until the pentagonal pointer 190 indicates the desired turn rate, for example, a position overlying the turn rate marking 165. As the aircraft turns, the scale 158 rotates in a counterclockwise direction. When the index marker 180, moving with the scale 158 approaches a co-radial position with the pentagonal pointer 190, the pilot maneuvers the aircraft in such a manner to assure a substantially unitary co-radial movement of the index marker, and the pentagonal pointer until they reach a co-radial position with the stationary pointer 166. This latter relationship indicates that the turn has been completed smoothly and perfectly. Thus, the indicator 148 provides the pilot not only with heading and turn rate information, but also enables him to execute smooth maneuvers and to hold constant headings or track angles in a manner which would otherwise be difficult to achieve.

Although this invention has been described with respect to particular embodiments, it is to be understood that the invention is not to be so limited as changes and modifications may be made thereto which are within the full intended scope of the invention as defined by the appended claims.

What is claimed is:

1. Apparatus for displaying information relating to the operation of a vehicle comprising:
   first display means including means responsive to one of two data sources for providing information representing a plurality of values of first operating conditions of the vehicle supplied by said one of two data sources, each value of said first operating conditions supplied by the first data source differing by a measurable constant from that supplied by the other data source,
   second display means providing information representing a plurality of values of second operating conditions of the vehicle as mathematical derivatives of the first operating conditions,
   first indicating means for indicating specific values of the first operating conditions on said first display means irrespective of which of the two data sources supplies the plurality of values of the first operating conditions,
   second indicating means responsive to one of said two data sources for indicating specific values of the second operating conditions on said second display means, said second indicating means being operatively disposed with respect to both first and second display means and including means for visually interrelating changes in said first operating conditions with the corrresponding second operating conditions.

2. Apparatus as set forth in claim 1 wherein said first display means includes a movable scale and said second display means includes a stationary scale.

3. Apparatus as set forth in claim 1 wherein each of said first and second display means includes a rectilinear scale, said scales being substantially parallel and positioned in side-by-side relationship.

4. Apparatus as set forth in claim 3 wherein one of said scales includes altitude markings thereon graduated to represent altitude of the vehicle and the other of said scales includes vertical speed markings thereon graduated to represent speed of the vehicle in a vertical direction.

5. Apparatus as set forth in claim 4 wherein said vertical speed markings are partitioned into an upwards set graduated to represent ascending speed of the vehicle and into a downwards set graduated to represent descending speed of the vehicle.

6. Apparatus as set forth in claim 1 wherein said first display means includes a movable scale having altitude markings thereon graduated to represent altitude of the vehicle and said second display means includes a stationary scale having vertical speed markings thereon graduated to represent velocity of the vehicle in a vertical direction, and wherein said first indicating means is adapted to indicate a specific value of altitude and said second indicating means is adapted to indicate a specific value of vertical speed.

7. Apparatus as set forth in claim 6 wherein said first indicating means includes a first pointer movable between an indicating position for indicating a specific value of altitude on said movable scale and a position withdrawn therefrom, and said second indicating means includes a second pointer movable relative to said stationary scale for indicating a specific value of vertical speed.

8. Apparatus as set forth in claim 1 wherein said first display means includes a first rectilinear scale having markings thereon representing a plurality of values of the first operating conditions and said second display means includes a second rectilinear scale having markings thereon representing a plurality of values of the second operating conditions including an initial reference mark, said first and second scales being substantially parallel and positioned in side-by-side relationship, said first scale being movable, first drive means responsive to the first operating conditions for moving said first scale accordingly, said first indicating means coextensive with said initial reference mark and being movable from an indicating position adjacent said markings on said first scale for indicating a specific value of the first operating condition to a position withdrawn therefrom, functional means operable for moving said first indicating means between said indicating position and said withdrawn position, said second indicating means being movable relative to said second scale for indicating a specific value of the second operating condition, second drive means responsive to the second operating conditions for moving said second indicating means accordingly relative to said second scale, selector means selectively operable for operating said first drive means to move said first scale such that the specific value of the first operating condition indicated by said first indicating means is transposed from an initial position coextensive said initial reference mark to a subsequent position adjacent said second indicating means, said selector means also operable to operate said functional means for moving said first indicating means from said indicating position to said withdrawn position.

9. Apparatus as set forth in claim 8 wherein said second scale is stationary.

10. Apparatus as set forth in claim 9 wherein said markings on said first scale are graduated to represent altitude of the vehicle and said markings on said second scale are graduated to represent vertical speed of the vehicle.

11. Apparatus as set forth in claim 10 wherein said markings on said second scale are partitioned into an upwards set graduated to represent ascending speed of the vehicle and into a downwards set graduated to represent descending speed of the vehicle, said initial reference mark being common to said upwards set and said downwards set.

12. Apparatus as set forth in claim 10 wherein said first indicating means includes a first pointer movable between an indicating position for indicating a specific value of altitude on said first scale coextensive with said initial reference mark and a position withdrawn therefrom, and said second indicating means includes a second pointer movable relative to said vertical speed markings for indicating a specific value of vertical speed.

13. Apparatus as set forth in claim 12 wherein said second drive means includes feedback means for measuring displacement along said first and second scales between said second pointer and said initial reference mark and operable for signalling said first drive means to move said first scale until the specific value of altitude thereon indicated by said first pointer is transposed from an initial position adjacent said initial reference mark to a subsequent position adjacent said second pointer.

14. Apparatus for displaying information relating to the operation of a vehicle comprising:
a primary source and an alternate source, each providing information relating to both first and second operating conditions of the vehicle,
said information relating to said first operating conditions as supplied by said primary source differing by a measurable constant from the information supplied by said alternate source,
switch means for selecting which of said primary and alternate sources shall provide, as a selected source, information relating to the first and second operating conditions,
movable display means responsive to said selected source for displaying information representing a plurality of values of the first operating conditions,
stationary display means displaying information representing a plurality of values of the second operating conditions as mathematical derivatives of the first operating conditions,
reference means for indicating a specific value of the first operating condition on said movable display means and simultaneously therewith responsive to said selected source for indicating a specific value of the second operating condition on said stationary display means.

15. Apparatus as set forth in claim 14 wherein said movable display means includes a first scale having markings thereon graduated to represent altitude of the vehicle, said stationary display means includes a second scale having markings thereon graduated to represent vertical speed of the vehicle, said primary source is a barometric device for determining barometric altitude and vertical speed and said alternate source is a radar device for determining absolute altitude and vertical speed.

16. Apparatus as set forth in claim 14 wherein said switch means includes a mode selector mechanism responsive to a failure of said primary source for automatically replacing said primary source with said alternate source.

17. Apparatus as set forth in claim 16 wherein said active source is a barometric device for determining barometric altitude and vertical speed and said inactive source is a radar device for determining absolute altitude and vertical speed.

18. Apparatus as set forth in claim 1 wherein each of said first and second display means includes an arcuate scale, said scales being substantially concentric.

19. Apparatus as set forth in claim 18 wherein one of said scales includes compass markings thereon graduated to represent heading of the vehicle and the other of said scales includes turn rate markings thereon graduated to represent turn rate of the vehicle.

20. Apparatus as set forth in claim 1 wherein said first display means includes a movable scale having compass markings thereon graduated to represent heading of the vehicle and said second display means includes a stationary scale having turn rate markings thereon graduated to represent turn rate of the vehicle, and wherein said reference means includes first indicia means for indicating a specific value of heading and second indicia means for indicating a specific value of turn rate.

21. Apparatus as set forth in claim 20 wherein said first indicia means includes a first pointer for indicating a specific value of heading on said movable scale and said second indicia means includes a second pointer movable relative to said stationary scale for indicating a specific value of turn rate.

22. Apparatus as set forth in claim 14 including an inertial navigation system and wherein said movable display means includes a first scale having markings thereon graduated to represent heading of the vehicle, said stationary display means includes a second scale having markings thereon graduated to represent turn rate of the vehicle, said primary source is a magnetic heading output from said inertial navigation system, and said alternate source is a true heading output from said inertial navigation system.

References Cited

UNITED STATES PATENTS

| | | | |
|---|---|---|---|
| 2,706,407 | 4/1955 | Hosford | 73—182 |
| 2,941,400 | 6/1960 | Nesbitt | 73—178 |
| 3,133,520 | 5/1964 | Bentkowsky et al. | 73—178X |
| 3,364,748 | 1/1968 | Armstrong | 116—129X |

DONALD O. WOODIEL, Primary Examiner

U.S. Cl. X.R.

73—179, 384; 116—129